(12) United States Patent
Davis et al.

(10) Patent No.: US 10,156,352 B2
(45) Date of Patent: Dec. 18, 2018

(54) IN MOLD ELECTRONIC PRINTED CIRCUIT BOARD ENCAPSULATION AND ASSEMBLY

(71) Applicants: Covestro LLC, Pittsburgh, PA (US); Thermal Solution Resources, LLC, Narragansett, RI (US)

(72) Inventors: Terry G. Davis, Kimball, MI (US); David Rocco, Bridgeville, PA (US); Mikhail Sagal, Wakefield, RI (US); Jessee McCanna, Midland, PA (US); Nicolas Sunderland, Venetia, PA (US); James Lorenzo, Mars, PA (US); Mark Matsco, Monaca, PA (US); Kevin Dunay, Bethel Park, PA (US)

(73) Assignees: COVESTRO LLC, Pittsburgh, PA (US); THERMAL SOLUTION RESOURCES, LLC, Warwick, RI (US)

( * ) Notice: Subject to any disclaimer, the term of this patent is extended or adjusted under 35 U.S.C. 154(b) by 445 days.

(21) Appl. No.: 14/784,975

(22) PCT Filed: Apr. 16, 2014

(86) PCT No.: PCT/US2014/034283
§ 371 (c)(1),
(2) Date: Oct. 16, 2015

(87) PCT Pub. No.: WO2014/172411
PCT Pub. Date: Oct. 23, 2014

(65) Prior Publication Data
US 2016/0084490 A1  Mar. 24, 2016

Related U.S. Application Data

(60) Provisional application No. 61/813,890, filed on Apr. 19, 2013.

(51) Int. Cl.
*F21V 29/87* (2015.01)
*F21K 9/23* (2016.01)
(Continued)

(52) U.S. Cl.
CPC ............ *F21V 29/87* (2015.01); *B29C 67/246* (2013.01); *F21K 9/23* (2016.08); *F21K 9/90* (2013.01);
(Continued)

(58) Field of Classification Search
CPC ....... B29C 67/246; F21K 9/272; F21K 9/275; F21K 9/278; F21K 9/235; F21K 9/237;
(Continued)

(56) References Cited

U.S. PATENT DOCUMENTS 2,465,319 A   3/1949  Rex et al.
2,991,273 A   7/1961  Wilhelm et al.
(Continued)

FOREIGN PATENT DOCUMENTS

BE        634741      11/1963
CN      201696943     1/2011
(Continued)

OTHER PUBLICATIONS

High Polymers, vol. XVI, "Polyurethanes, Chemistry and Technology," by Saunders and Frisch, Interscience Publishers, New York, London, vol. I, 1962, pp. 32-42 and 44-54, and vol. 11, 1964, pp. 5-6 and 198-199.
(Continued)

*Primary Examiner* — Mariceli Santiago
(74) *Attorney, Agent, or Firm* — Richard P. Bender

(57) ABSTRACT

The present invention provides an assembly comprising a thermally conductive thermoplastic polymer as a heat sink to provide thermal management for an electrical/electronic component and a reaction injection molded (RIM) polyure-
(Continued)

thane to replace the potting compound typically used in such assemblies. In addition to replacing the potting compound, the cured polyurethane forms the part, such as the base of the LED bulb, which heretofore has been a separate component, thus reducing the number of components and saving a production step.

27 Claims, 5 Drawing Sheets

(51) Int. Cl.

| | | |
|---|---|---|
| *B29C 67/24* | (2006.01) | |
| *F21K 99/00* | (2016.01) | |
| *F21K 9/90* | (2016.01) | |
| *F21V 23/00* | (2015.01) | |
| *F21V 29/77* | (2015.01) | |
| *B29K 75/00* | (2006.01) | |
| *B29K 669/00* | (2006.01) | |
| *B29L 31/34* | (2006.01) | |
| *F21V 31/04* | (2006.01) | |
| *F21Y 105/10* | (2016.01) | |
| *F21Y 115/10* | (2016.01) | |

(52) U.S. Cl.
CPC .......... *F21V 23/006* (2013.01); *F21V 29/773* (2015.01); *B29K 2075/00* (2013.01); *B29K 2669/00* (2013.01); *B29K 2995/0013* (2013.01); *B29L 2031/3425* (2013.01); *F21V 31/04* (2013.01); *F21Y 2105/10* (2016.08); *F21Y 2115/10* (2016.08)

(58) Field of Classification Search
CPC .......... F21K 9/238; F21V 29/70–29/89; H01L 33/64
See application file for complete search history.

(56) References Cited

U.S. PATENT DOCUMENTS

| | | |
|---|---|---|
| 2,999,835 A | 9/1961 | Goldberg |
| 2,999,846 A | 9/1961 | Hermann et al. |
| 3,028,356 A | 4/1962 | Shepard et al. |
| 3,028,365 A | 4/1962 | Hermann et al. |
| 3,036,036 A | 5/1962 | Howe |
| 3,047,539 A | 7/1962 | Pengilly |
| 3,110,695 A | 11/1963 | John |
| 3,148,172 A | 9/1964 | Fox |
| 3,153,008 A | 10/1964 | Fox |
| 3,155,728 A | 11/1964 | Lesesne |
| 3,236,895 A | 2/1966 | Malcolm et al. |
| 3,271,367 A | 9/1966 | Hermann et al. |
| 3,304,273 A | 2/1967 | Stamberger |
| 3,383,351 A | 5/1968 | Stamberger |
| 3,523,093 A | 8/1970 | Stamberger |
| 3,544,514 A | 12/1970 | Schnell et al. |
| 3,544,615 A | 12/1970 | Popplesdorf |
| 3,580,952 A | 5/1971 | Moshel |
| 3,654,370 A | 4/1972 | Yeakey |
| 3,659,779 A | 5/1972 | Berkman et al. |
| 3,692,744 A | 9/1972 | Rich et al. |
| 3,726,952 A | 4/1973 | Boden et al. |
| 3,808,250 A | 4/1974 | Blahak et al. |
| 3,865,791 A | 2/1975 | Brinkmann et al. |
| 3,879,347 A | 4/1975 | Serini et al. |
| 3,879,348 A | 4/1975 | Serini et al. |
| 3,890,266 A | 6/1975 | Serini et al. |
| 3,912,688 A | 10/1975 | Schiller et al. |
| 3,925,527 A | 12/1975 | Kleimann et al. |
| 3,953,394 A | 4/1976 | Fox et al. |
| 3,975,428 A | 8/1976 | Blahak et al. |
| 4,016,143 A | 4/1977 | Blahak et al. |
| 4,058,492 A | 11/1977 | Von Bronin et al. |
| 4,098,731 A | 7/1978 | Von Bonin et al. |
| 4,125,571 A | 11/1978 | Scott et al. |
| 4,125,572 A | 11/1978 | Scott |
| 4,136,091 A | 1/1979 | Mazanek et al. |
| 4,188,314 A | 2/1980 | Fox et al. |
| 4,201,847 A | 5/1980 | Kleimann et al. |
| 4,210,741 A | 7/1980 | Baggett |
| 4,218,543 A | 8/1980 | Weber et al. |
| 4,224,417 A | 9/1980 | Hajek et al. |
| 4,254,228 A | 3/1981 | Kleimann et al. |
| 4,267,096 A | 5/1981 | Bussink et al. |
| 4,276,096 A | 6/1981 | Kolaska |
| 4,352,907 A | 10/1982 | Lee |
| 4,391,954 A | 7/1983 | Scott |
| 4,433,067 A | 2/1984 | Rice et al. |
| 4,444,910 A | 4/1984 | Rice et al. |
| 4,504,313 A | 3/1985 | Robertson |
| 4,515,923 A | 5/1985 | Fauss et al. |
| 4,519,965 A | 5/1985 | Taylor et al. |
| 4,581,386 A | 4/1986 | Taylor et al. |
| 4,585,803 A | 4/1986 | Nelson et al. |
| 4,630,941 A | 12/1986 | Chainer et al. |
| 4,764,540 A | 8/1988 | Dewhurst et al. |
| 4,774,263 A | 9/1988 | Weber et al. |
| 4,774,264 A | 9/1988 | Weber et al. |
| 4,786,692 A | 11/1988 | Allen et al. |
| 4,789,688 A | 12/1988 | Dewhurst et al. |
| 4,810,820 A | 3/1989 | Slack et al. |
| 4,847,307 A | 7/1989 | Dewhurst et al. |
| 4,868,224 A | 9/1989 | Harasin et al. |
| 4,876,019 A | 10/1989 | Meyer et al. |
| 4,895,879 A | 1/1990 | Nelson et al. |
| 4,906,721 A | 3/1990 | Weitemeyer et al. |
| 4,929,697 A | 5/1990 | Nodelman |
| 4,954,537 A | 9/1990 | Sanns, Jr. |
| 4,983,706 A | 1/1991 | Fontana et al. |
| 5,003,027 A | 3/1991 | Nodelman |
| 5,086,157 A | 2/1992 | Reuter et al. |
| 5,104,723 A | 4/1992 | Freitag et al. |
| 5,105,004 A | 4/1992 | Reuter et al. |
| 5,109,076 A | 4/1992 | Freitag et al. |
| 5,124,427 A | 6/1992 | Potter et al. |
| 5,126,428 A | 6/1992 | Freitag et al. |
| 5,135,962 A | 8/1992 | Lau et al. |
| 5,198,508 A | 3/1993 | Ueda et al. |
| 5,208,268 A | 5/1993 | Mafoti |
| 5,208,334 A | 5/1993 | Potter et al. |
| 5,235,018 A | 8/1993 | Potter et al. |
| 5,350,778 A | 9/1994 | Steppan et al. |
| 5,401,826 A | 3/1995 | Sakashita et al. |
| 5,407,994 A | 4/1995 | Sarabi et al. |
| 5,444,146 A | 8/1995 | Potter et al. |
| 5,563,232 A | 10/1996 | Hurley et al. |
| 5,585,452 A | 12/1996 | Hurley et al. |
| 5,614,605 A | 3/1997 | Mafoti et al. |
| 5,663,272 A | 9/1997 | Slack et al. |
| 5,686,042 A | 11/1997 | Slack et al. |
| 5,783,652 A | 7/1998 | Rosthauser et al. |
| 5,789,519 A | 8/1998 | Slack et al. |
| 5,859,163 A | 1/1999 | Slack et al. |
| 6,028,158 A | 2/2000 | Slack et al. |
| 6,063,891 A | 5/2000 | Slack et al. |
| 6,680,015 B2 | 1/2004 | McCullough |
| 7,235,918 B2 | 6/2007 | McCullough et al. |
| 8,221,885 B2 | 7/2012 | Miller |
| 2002/0148496 A1* | 10/2002 | Dorner .................. H01L 31/048 264/259 |
| 2004/0229035 A1 | 11/2004 | Sagal et al. |
| 2005/0213331 A1* | 9/2005 | Lewis .................... A42B 3/044 362/294 |
| 2008/0074871 A1* | 3/2008 | Meis ........................ F21K 9/00 362/218 |
| 2008/0287585 A1 | 11/2008 | Brown |
| 2009/0021529 A1* | 1/2009 | Wendler .................. G09F 9/33 345/619 |
| 2010/0072416 A1 | 3/2010 | Fujioka et al. |
| 2011/0095690 A1 | 4/2011 | Sagal |
| 2011/0103021 A1 | 5/2011 | Janssen et al. |

(56) References Cited

U.S. PATENT DOCUMENTS

| | | | |
|---|---|---|---|
| 2011/0169406 A1* | 7/2011 | Weekamp | F21V 3/00 315/32 |
| 2011/0273874 A1 | 11/2011 | Verrat-Debailleul et al. | |
| 2011/0281051 A1 | 11/2011 | Dufaure et al. | |
| 2012/0153865 A1* | 6/2012 | Rolfes | F21V 23/003 315/294 |
| 2012/0161603 A1* | 6/2012 | Van Montfort | H01L 51/5237 313/46 |
| 2012/0187831 A1 | 7/2012 | Maxik et al. | |
| 2012/0307501 A1 | 12/2012 | Tankala et al. | |
| 2012/0319031 A1 | 12/2012 | Li et al. | |
| 2014/0036500 A1* | 2/2014 | Eggleton | H01L 25/0753 362/235 |
| 2014/0056001 A1* | 2/2014 | Hsu | F21V 23/006 362/249.02 |
| 2014/0104834 A1* | 4/2014 | Holland | B23P 15/26 362/249.02 |
| 2014/0268768 A1* | 9/2014 | Holland | F21K 9/30 362/249.02 |

FOREIGN PATENT DOCUMENTS

| | | |
|---|---|---|
| DE | 2948419 | 8/1981 |
| FR | 1466708 | 1/1957 |
| GB | 885442 | 12/1961 |
| GB | 1040452 | 8/1966 |
| GB | 1122003 | 7/1968 |
| GB | 1229482 | 4/1971 |
| GB | 1365215 | 8/1974 |
| GB | 1367790 | 9/1974 |
| GB | 1368338 | 9/1974 |
| JP | 2009161582 | 7/2009 |
| JP | 2013069514 A | 4/2013 |
| KR | 1020120032597 | 4/2012 |
| WO | 2011010535 A1 | 1/2011 |
| WO | 2011013645 | 2/2011 |

OTHER PUBLICATIONS

Kunststoff-Handbuch, vol. VII, Vieweg-Hochtlen, Carl Hanser Verlag, Munich, 1966, pp. 45-71.

* cited by examiner

IN MOLD ELECTRONIC PRINTED CIRCUIT BOARD ENCAPSULATION AND ASSEMBLY

RELATED APPLICATION

This application claims the benefit, under 35 USC § 119(e), of U.S. Provisional Application No. 61/813,890, filed Apr. 19, 2013 entitled "IN MOLD ELECTRONIC PCB CIRCUIT BOARD ENCAPSULATION AND ASSEMBLY"; the entirety of which is incorporated herein by reference.

FIELD OF THE INVENTION

The present invention relates in general to electronics and more specifically to an in mold electronic printed circuit board encapsulation and assembly.

BACKGROUND OF THE INVENTION

State of the art LED light bulbs and other electronics contain printed circuit boards (PCBs) and other electronic components which must be electrically isolated from user contact. These devices must also have sufficient thermal management to keep operating temperatures below a critical value to extend service life. A number of workers in this area have attempted to provide plastic, polymer materials to assist in the thermal management.

U.S. Pat. No. 7,235,918, issued to McCullough et al., provides a thermally-conductive polymer composition suitable for making molded reflector articles having light-reflecting surfaces. The composition contains: a) about 20% to about 80% by weight of a base polymer matrix, such as polycarbonate; and b) about 20% to about 80% by weight of a thermally-conductive carbon material, such as graphite. The composition is said to be useful in making reflector articles such as housings for automotive tail lamps, head lamps, and other lighting fixtures. A method for manufacturing reflector articles is also provided by McCullough et al.

Brown in U.S. Published Patent Application No. 2008/0287585 details thermally-conductive compositions and reaction tubes for chemical- and biochemical-based analytical processing. The compositions and reaction tubes contain at least one plastic and at least one compound having a higher thermal conductivity than the at least one plastic to result in compositions and tubes having increased thermal conductivity when compared to the at least one plastic alone. Such compositions and tubes are said to be capable of facilitating rapid heat transfer in numerous heat transfer applications. The thermally-conductive compositions and reaction tubes of Brown are said to be especially suitable for containing reaction constituents during thermal cycling of the polymerase chain reaction (PCR).

JP 2009-161582, in the name of Maruyama et al., provides a conductive polycarbonate resin composition said to have excellent antistaticity, electromagnetic wave-shielding property, mechanical strengths, thermal stability, and appearance. The polycarbonate resin composition contains (A) 50 to 90 wt. % of a polycarbonate resin and (B) 50 to 10 wt. % of graphite, wherein the concentration of silicon in the graphite (B) is ≤1,000 ppm.

Fujioka et al., in U.S. Published Patent Application No. 2010/0072416, describe a heat-dissipating resin composition that is said to be useful for forming a substrate for LED mounting or a reflector provided on the substrate for LED mounting and is excellent in heat dissipation, electrical insulation, heat resistance and light resistance while an LED element emits light, a substrate for LED mounting and a reflector comprising the composition. The composition of Fujioka et al. contains a thermoplastic resin such as modified polybutylene terephthalate and a thermally conductive filler consisting of scaly boron nitride or the like, and has thermal deformation temperature of 120° C. or higher, a thermal conductivity of 2.0 W/(mK) or higher, and a thermal emissivity of 0.7 or higher.

U.S. Published Patent Application No. 2011/0095690 in the name of Sagal discloses an LED lighting apparatus which includes an electronic circuit board having a peripheral portion and a central portion that is radially inward of said peripheral portion, said electronic circuit board having an exterior side for optically interfacing with ambient environment during operation and an interior side opposite the exterior side. At least one LED is mounted on the exterior side of the electronic circuit board central portion and a thermally conductive housing encloses said electronic circuit board, said thermally conductive housing formed of a moldable thermally conductive material. The thermally conductive housing defines a first cavity adjacent the central portion of the electronic circuit board exterior side and a second cavity adjacent the central portion of the electronic circuit board interior side, wherein a portion of said thermally conductive housing being overmolded onto said peripheral portion.

Janssen et al., in U.S. Published Patent Application No. 2011/0103021, describe a heatsink for an electrical or electronic device comprising a plastic body made of a thermally conductive plastic material comprising of an expanded graphite in an amount of at least 20 wt. %, relative to the total weight of the thermally conductive plastic material.

U.S. Published Patent Application No. 2011/0281051 in the name of Dufaure et al. discloses an expanded graphite, in which the specific surface is between 15 and 30 m2/g, the apparent density is less than 0.1 g/cm3, for an average particle size of more than 15 μm, to grant a thermoplastic polymer properties of thermal, electric and rheological conductivity suitable for the transformation of said polymer.

Takeuchi et al., in PCT Published Patent Application No. WO 2011/013645, describe a polycarbonate resin composition which contains, per 100 parts by mass of (A) a polycarbonate resin, 30-100 parts by mass of (B) artificial graphite, 0.01-5 parts by mass of (C) an organopolysiloxane that has a group selected from among a phenyl group, a methoxy group and a vinyl group, and 0.01-5 parts by mass of (D) a fluorine compound. Also disclosed are: a molded body which is obtained by molding the polycarbonate resin composition; and a component for an electrical/electronic device, a case for an electrical/electronic device and a chassis for an electrical/electronic device, each comprising the molded body. The polycarbonate resin composition provides a molded article which is said to have high thermal conductivity and high mechanical strength, while exhibiting high flame retardancy even in cases when the molded article is formed thin.

U.S. Pat. No. 8,221,885, issued to Miller, describes an injection moldable, thermally conductive polymer composition said to have ultra low CTE properties and suitable both for substrate applications in high precision electronics assemblies as well as over molding applications in conjunction with ceramic substrates. The composition includes a base polymer matrix material loaded with thermally conductive filler, which is said to impart thermal conductivity to the polymer matrix while also maintaining or enhancing the dielectric properties of the base polymer. Miller says the resultant composition exhibits CTE properties in the range of between 9 ppm/° C. and 2 ppm/° C., exhibits an optical anisotropy of below 1.5, and a thermal conductivity of greater than 2 W/m° K. The composition of Miller is said to be suitable for use in over molding applications in conjunction with virtually any suitable electronics substrate material without the introduction of mechanical stresses produced by large CTE differentials.

Li et al, in U.S. Published Patent Application No. 2012/0319031, describe a composition containing about 90% to about 30% of at least one amorphous thermoplastic or at least one semi crystalline thermoplastic or a mixture thereof and about 10% to about 70% of expanded graphite, wherein about 90% of the particles of the expanded graphite have a particle size of at least about 200 microns. The compositions of Li et al. are said to be useful use in LED heat sink applications.

The above cited references teach, in general, that thermally conductive fillers are added to thermoplastic resin to make the resultant composite thermally conductive. These thermally conductive fillers can be carbon based, such as carbon fibers, graphites, and carbon black. They can be ceramic-based, such as boron nitride, aluminum carbide.

A need continues to exist in the art for further improvements to materials for use in thermal management in electronic devices such as LED lamps.

SUMMARY OF THE INVENTION

Accordingly, the present invention provides an assembly comprising a thermally conductive amorphous thermoplastic polymer as a heat sink to provide thermal management for an electrical/electronic component and a reaction injection molded (RIM) polyurethane to replace the potting compound typically used in such assemblies. In addition to replacing the potting compound, the cured polyurethane forms the part, such as the base of the LED bulb, which heretofore has been a separate component, thus saving a production step.

These and other advantages and benefits of the present invention will be apparent from the Detailed. Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1B:
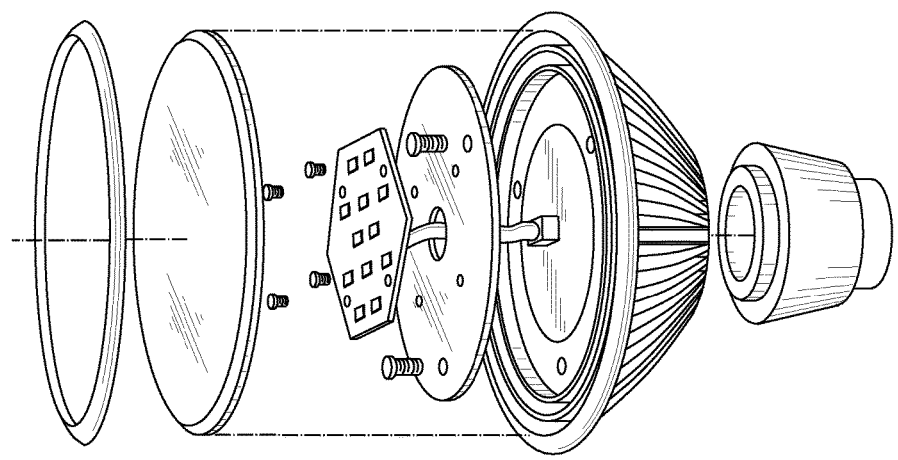
FIGS. 1A and 1B show a prior art LED lamp.

The present invention will now be described for purposes of illustration and not limitation. Except in the operating examples, or where otherwise indicated, all numbers expressing quantities, percentages, and so forth in the specification are to be understood as being modified in all instances by the term "about."

"Encapsulate" as used in the context of the present description means that a material at least, partially and perhaps fully surrounds a component of the assembly. It does not necessarily mean that a component is hermetically sealed against the environment, but it may have such a meaning. In case of a housing made of thermally conductive thermoplastic resin, the heat sink, "encapsulates" preferably means that the electrical/electronic component, preferably an LED light source together with an LED printed circuit board, is surrounded by the housing on the sides, while the housing may be open at the top and the bottom to permit electrical connections for example. "Encapsulate" in case of the reaction injection molded polyurethane preferably means, in case of an LED lamp, that the electronic driver board is shielded against the user, i.e., the polyurethane surrounds the electronic driver board on the lateral sides and preferably on the lower side, but not necessarily on the upper side, preferably not on the upper side.

"Forming the assembly" as used in the context of the present description means that the polyurethane not only partly or fully surrounds a component of the assembly, but also may have a joining function. In case of the exemplified LED lamp, the polyurethane preferably joins the housing with the traditional "Edison" style screw-in base, wherein the housing and the reaction injection molded polyurethane are preferably joined via mechanical joining technology, for example by a tongue and groove connection.

The present invention provides an assembly comprising a heat sink comprising a thermally conductive thermoplastic polymer composition; an electrical/electronic component; and a polyurethane, wherein the heat sink partially or fully surrounds the electrical/electronic component, and wherein the polyurethane is reaction injection molded partially or fully surrounds the heat sink and additional electronic components to form the assembly.

The present invention further provides a process of making an assembly comprising partially or fully surrounding an electrical/electronic component with a heat sink comprising a thermally conductive thermoplastic polymer; and forming the assembly by partially or fully surrounding the heat sink with a reaction injection molded polyurethane.

The inventive RIM polyurethane and thermally conductive thermoplastic polymer heat sink combination eliminates the need for a potting compound, a separate base housing, and fasteners or adhesives in the production of electronic devices such as LED lamps.

The thermally conductive thermoplastic polymer useful in the present invention may be made from an amorphous thermoplastic polymer or from a blend of an amorphous thermoplastic polymer and a semicrystalline thermoplastic polymer or from a blend of an amorphous thermoplastic polymer and a rubber, such as acrylonitrile-butadiene-styrene (ABS) or styrene-acrylonitrile copolymer (SAN). Such blends are commercially available from Bayer MaterialScience under the BAYBLEND tradename.

Suitable amorphous thermoplastic polymers within the meaning of this invention are, in particular, amorphous polycarbonates, amorphous polyesters and amorphous polyolefins as well as, copolymers and polymer blends thereof. Amorphous polyolefins include both open-chain polyolefins such as polypropylene as well as cyclic olefin copolymers. Preferred as amorphous thermoplastic polymers in the context of the present invention are polycarbonate, polymethylmethacrylate (PMMA) and polystyrene, with polycarbonate being particularly preferred.

Amorphous and semicrystalline thermoplastics may be blended into a resin composition useful in the present invention. Examples of blends of amorphous and semicrystalline thermoplastics are well known to those skilled in the art. Some examples of such blends are polycarbonate and polyethylene terephthalate, polycarbonate and polybutylene terephthalate, polycarbonate and polyphenylene sulfide, polycarbonate and), liquid crystalline polymers. Some of these blends are commercially available from Bayer MaterialScience under the trade name MAKROBLEND. There is no limitation on what kind of amorphous thermoplastic to blend with what kind of semicrystalline thermoplastic as long as the resulted blend serves the intended application.

Semicrystalline thermoplastic polymers and methods of their production are known to those skilled in the art. Preferred semicrystalline thermoplastic polymers for use in the inventive composition include, but are not limited to, polyethylene, polypropylene, polybutylene terephthalate and polyethylene terephthalate, polyphenylene sulfide, polyphenylene either, liquid crystalline polymers, and polyamide.

Where present in a blend, the semicrystalline thermoplastic polymer may be present in an amount ranging from 90% to 30% of the composition useful in the present invention, more preferably from 80% to 40% and most preferably from 70% to 50%. The semicrystalline thermoplastic polymer may be present in the composition useful in the present invention in an amount ranging between any combination of these values, inclusive of the recited values.

The inventive process involves injection molding a heat sink component using a thermally conductive thermoplastic polymer, preferably a material such as MAKROLON TC8030, a polycarbonate commercially available from Bayer MaterialScience. The LED circuit board is inserted into a mold and a thermally conductive thermoplastic polymer heat sink is molded around it. The heat sink may contain features, holes or undercuts to act as a joint with mechanical interlock to allow a polyurethane to better bond to the heat sink. The heat sink component is subsequently inserted into a mold designed for reaction injection molded (RIM) polyurethane. Additional electronics such as the LED driver/controller board may be inserted into the heat sink cavity. Polyurethane RIM material is injected into the cavity, filling the lower portion of the heat sink encapsulating the driver electronics and replacing the potting material currently used for metal heat sinks. After filling the lower cavity in the heat sink, the polyurethane may continue to fill the mold, forming the base of the bulb which terminates in the traditional "Edison" style screw-in base.

Thermally conductive polycarbonate is commercially available for example from Bayer MaterialScience LLC under names MAKROLON TC8060 and TC8030. These materials, which contain polycarbonate and expanded graphite, are particularly preferred in the practice of the present invention and are described in greater detail in U.S. Published Patent Application No. 2012/0319031, the entire contents of which are incorporated by reference herein. The compositions provided in the '031 application contain from 90 wt.-% to 30 wt.-% of at least one amorphous thermoplastic or at least one semi crystalline thermoplastic or a mixture thereof and 10 wt.-% to 70 wt.-% of expanded graphite, wherein 90 wt.-% of the particles of the expanded graphite have a particle size of at least 200 microns. As those skilled in the art will appreciate, other thermally conductive polymers may also be used.

Suitable polycarbonate resins for preparing the composition useful in the present invention are homopolycarbonates and copolycarbonates, both linear or branched resins and mixtures thereof. As used herein, the term "polycarbonate" includes homopolycarbonates such as BPA polycarbonate, copolycarbonates derived from two or more different dihydric phenols, and copolyestercarbonates which include structural units derived from one or more dihydric phenols and one or more diacid derived structural units. The diacid, for example, includes dodecandioic acid, terephthalic acid, isophthalic acid. U.S. Pat. No. 4,983,706 describes a method for making copolyestercarbonate.

The polycarbonates have a weight average molecular weight (as determined by gel permeation chromatography, or size-exclusion chromatography) of preferably 10,000 to 200,000 g/mol, more preferably 20,000 to 80,000 g/mol and their melt flow rate, per ASTM D-1238 at 300° C. and 1.2 kg weight, is preferably 1 to 80 g/10 min, more preferably 20 to 65 g/10 min. Such polycarbonates may be prepared, for example, by the known diphasic interface process from a carbonic acid derivative such as phosgene and dihydroxy compounds by polycondensation (See, German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964).

In the present context, dihydroxy compounds suitable for the preparation of the polycarbonates useful in the invention conform to the structural formulae (1) or (2) below.

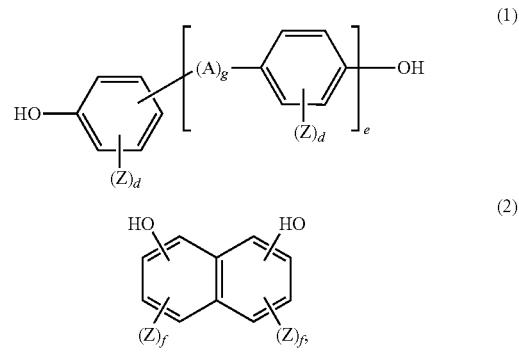

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO2 or a radical conforming to

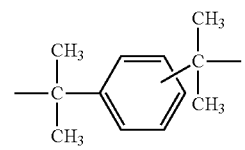

e and g both denote the number 0 to 1;
Z denotes F, Cl, Br or $C_1$-$C_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the present invention are hydroquinone, resorcinol, bis-(hydroxyphenyl)-alkanes, bis-(hydroxy-phenyl)-ethers, bis-(hydroxyphenyl)-ketones, bis-(hydroxy-phenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,401,826; 5,105,004; 5,126,428; 5,109,076; 5,104,723; 5,086,157; 3,028,356; 2,999,835; 3,148,172; 2,991,273; 3,271,367; and 2,999,846, the entire contents of which are incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, 4,4'-dihydroxy-diphenyl, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxy-phenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxy-phenyl)-3,3,5-trimethylcyclohexane. The most preferred bisphenol is 2,2-bis-(4-hydroxyphenyl)-propane (bisphenol A).

The polycarbonates useful in the invention may entail in their structure units derived from one or more of the suitable bisphenols. Among those resins suitable in the practice of the invention are phenolphthalein-based polycarbonate, copolycarbonates and terpolycarbonates such as are described in U.S. Pat. Nos. 3,036,036 and 4,210,741, both of which are incorporated by reference herein.

The polycarbonates useful in the present invention may also be branched by condensing therein small quantities, e.g., 0.05 to 2.0 mol % (relative to the bisphenols) of polyhydroxyl compounds. Polycarbonates of this type have been described, for example, in German. Offenlegungsschriften 1,570,533; 2,116,974 and 2,113,374; British Patents 885,442 and 1,079,821 and U.S. Pat. No. 3,544,514, which is incorporated herein by reference. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxy-phenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in U.S. Pat. Nos. 3,028,365; 2,999,846; 3,153,008; and 2,991,273 which are incorporated herein by reference.

The preferred process for the preparation of polycarbonates is the interfacial polycondensation process. Other methods of synthesis in forming the polycarbonates of the invention, such as disclosed in U.S. Pat. No. 3,912,688, incorporated herein by reference, may be used. Suitable polycarbonate resins are available in commerce, for instance, from Bayer MaterialScience under the MAKROLON trademark.

The term polyester as used herein is meant to include homo-polyesters and co-polyesters resins. These are resins the molecular structure of which include at least one bond derived from a carboxylic acid, preferably excluding linkages derived from carbonic acid. These are known resins and may be prepared through condensation or ester interchange polymerization of the diol component with the diacid according to known methods. Suitable resins include poly(alkylene dicarboxylates), especially poly(ethylene terephthalate) (PET), poly(1,4-butylene terephthalate) (PBT), poly(trimethylene terephthalate) (PTT), poly(ethylene naphthalate) (PEN), poly(butylenes naphthalate) (PBN), poly(cyclohexanedimethanol terephthalate) (PCT), poly(cyclohexanedimethanol-co-ethylene terephthalate) (PETG or PCTG), and poly(1,4-cyclohexanedimethyl-1,4-cyclohexanedicarboxylate) (PCCD).

U.S. Pat. Nos. 2,465,319, 3,953,394 and 3,047,539, all incorporated herein by reference herein, disclose suitable methods for preparing such resins. The suitable polyalkylene terephthalates are characterized by an intrinsic viscosity of at least 0.2 and preferably at least 0.4 deciliter/gram as measured by the relative viscosity of an 8% solution in orthochlorophenol at 25° C. The upper limit is not critical but it preferably does not exceed 2.5 deciliters/gram. Especially preferred polyalkylene terephthalates are those with an intrinsic viscosity in the range of 0.4 to 1.3 deciliter/gram.

The alkylene units of the polyalkylene terephthalates which are suitable for use in the present invention contain from 2 to 5, preferably 2 to 4 carbon atoms. Polybutylene terephthalate (prepared from 1,4-butanediol) and polyethylene terephthalate are the preferred tetraphthalates for use in the present invention. Other suitable polyalkylene terephthalates include polypropylene terephthalate, polyisobutylene terephthalate, polypentyl terephthalate, polyisopentyl terephthalate, and polyneopentyl terephthalate. The alkylene units may be straight chains or branched chains.

The preferred polyalkylene terephthalates may contain, in addition to terephthalic acid groups, up to 20 mol % of groups from other aromatic dicarboxylic acids with 8 to 14 carbon atoms or aliphatic dicarboxylic acids with 4 to 12 carbon atoms, such as groups from phthalic acid, isophthalic acid, naphthalene-2,6-dicarboxylic acid, 4,4'-di-phenyl-dicarboxylic acid, succinic, adipic, sebacic, azelaic acids or cyclohexanediacetic acid. The preferred polyalkylene terephthalates may contain, in addition to ethylene glycol or butanediol-1,4-groups, up to 20 mol % of other aliphatic diols with 3 to 12 carbon atoms or cylcoaliphatic diols with 6 to 21 carbon atoms, e.g., groups from propanediol-1,3,2-ethylpropanediol-1,3, neopentyl glycol, pentanediol-1,5, hexanediol-1,6, cyclohexane-dimethanol-1,4,3-methylpentanediol-2,4,2-methyl-pentanediol-2,4,2,2,4-trimethylpentanediol-1,3, and -1,6,2-ethylhexanediol-1,3,2,2-diethylpropanediol-1,3, hexanediol-2,5,1,4-di-(β-hydroxyethoxy)-benzene, 2,2-bis-(4-hydroxycyclohexyl)-propane, 2,4-dihydroxy-1,1,3,3-tetra-methyl-cyclobutane, 2,2-bis-(3-β- hydroxyethoxyphenyl)-propane and 2,2-bis-(4-hydroxypropoxyphenyl)-propane (DE-OS 24 07 674, 24 07 776, 27 15 932).

The polyalkylene terephthalates may be branched by incorporating relatively small amounts of 3- or 4-hydric alcohols or 3- or 4-basic carboxylic acids, such as are described, for example, in DE-OS 19 00 270 and U.S. Pat. No. 3,692,744. Examples of preferred branching agents comprise trimesic acid, trimellitic acid, trimethylol-ethane and -propane and pentaerythritol. Preferably no more than 1 mol % of branching agent, with respect to the acid component, is used.

Polyalkylene terephthalates prepared solely from terephthalic acid and its reactive derivatives (e.g. its diallyl esters) and ethylene glycol and/or butanediol-1,4 (polyethyleneterephthalate and polybutyleneterephthalate) and mixtures of these polyalkylene terephthalates are particularly preferred.

Suitable polyalkylene terephthalates are disclosed in U.S. Pat. Nos. 4,267,096; 4,786,692; 4,352,907; 4,391,954; 4,125,571; 4,125,572; and 4,188,314, 5,407,994 the disclosures of which are incorporated herein by reference.

The at least one amorphous thermoplastic is present in an amount ranging from 90% to 30% of the composition useful in the present invention, more preferably from 80% to 40% and most preferably from 70% to 50%. The at least one amorphous thermoplastic may be present in the composition of the present invention in an amount ranging between any combination of these values, inclusive of the recited values.

Expanded graphite and methods of its production are known to those skilled in the art. Expanded graphite may present in an amount ranging from 10 wt.-% to 70 wt.-% of the composition useful the present invention, more preferably from 20 wt.-% to 60 wt.-% and most preferably from 30 wt.-% to 50 wt.-%. The expanded graphite may be present in an amount ranging between any combination of these values, inclusive of the recited values. It is preferred that at least 90% of the particles of the expanded graphite should have a particle size of at least 200 microns. There are also highly thermally conductive expanded graphites commercially available, which have a lower particles size, e.g., where 90% of the particles have a particle size of 100 μm maximum, which may alternatively be used.

The thermally conductive polycarbonate composition may further include effective amounts of any of the additives known for their function in the context of thermoplastic molding compositions. These include any one or more of lubricants, mold release agents, for example pentaerythritol tetrastearate, nucleating agents, antistatic agents, other antioxidants, thermal stabilizers, light stabilizers, hydrolytic stabilizers, impact modifiers, fillers and reinforcing agents, colorants or pigments, as well as further flame retarding agents, other drip suppressants or a flame retarding synergists. The additives may be used in effective amounts, preferably of from 0.01 to a total of 30 wt.-% relative to the total weight of the polycarbonate component.

The thermally conductive polycarbonate composition may be produced by conventional procedures using conventional equipment. It may be used to produce moldings of any kind by thermoplastic processes such as injection molding, extrusion and blow molding methods.

As known to those in the art, a wide variety of different molded polyurethane parts may be produced by the reaction injection molding ("RIM") process. This process involves filling a closed mold with highly reactive liquid starting components within a very short time, generally by using high output, high pressure dosing apparatus after the components have been mixed. The RIM process involves the intimate mixing of a polyisocyanate component and an isocyanate-reactive component, followed by the injection of this mixture into a mold for subsequent rapid curing. The polyisocyanate component may preferably be based on a liquid polyisocyanate. The isocyanate-reactive component contains a high molecular weight isocyanate-reactive component, preferably a polyol and/or an amine polyether, and may contain a chain extender containing amino and/or hydroxyl groups.

A number of US patents describe various RIM processes, all which are suitable in the practice of the present invention including U.S. Pat. Nos. 4,218,543; 4,433,067; 4,444,910; 4,530,941; 4,774,263; 4,774,264; 4,929,697; 5,003,027; 5,350,778; 5,563,232; 5,585,452; and 5,686,042, the entire contents of which are incorporated by reference herein. Polyurethanes useful in RIM processes are preferably produced by the reaction at least one relatively high molecular weight hydroxyl-containing polyol, at least one chain extender; and at least one polyisocyanate, polyisothiocyanate or mixture thereof.

Suitable polyisocyanates which can be used in the practice of the present invention include those commonly used for the production of polyurethane systems such as diphenylmethane-4,4'- and/or -2,4'- and/or -2,2'-diisocyanate (MDI); and the technical polyphenyl-polymethylene polyisocyanates obtained by phosgenating aniline-formaldehyde condensates and described, for example, in British Patent No. 874,430, and 848,671 (MDI containing polynuclear polyisocyanates). The modified polyisocyanates obtained by the modification of MDI, for example, polyisocyanates modified with polyols through urethane groups, carbodiimide polyisocyanates, isocyanurate polyisocyanates, biuretized polyisocyanates, allophanatized polyisocyanates or uretdione polyisocyanates are examples of suitable modified technical isocyanates.

Allophanate-modified polyisocyanates which are also suitable for use in the present invention include, for example, those which are known and described in, for example, U.S. Pat. Nos. 4,810,820, 5,124,427, 5,208,334, 5,235,018, 5,444,146, 5,614,605, 5,663,272, 5,783,652, 5,789,519, 5,859,163, 6,028,158, 6,063,891, the disclosures of which are herein incorporated by reference.

The polyisocyanate component may also comprise an NCO-terminated prepolymer. Suitable NCO-terminated prepolymers comprise the reaction product of a polyisocyanate as described above with an isocyanate-reactive compound. Suitable isocyanate-reactive compounds are those having a molecular weight of less than 1,000 g/ml or so, preferably less than 500 g/mol and more preferably less than 300 g/mol, and having a hydroxyl functionality of 2 to 4. Preferably, these prepolymers are formed by reacting MDI/PMDI with an isocyanate-reactive component in quantities such that the NCO content is from 10 to 30 wt.-%, preferably from 15 to 30 wt.-%, and most preferably from 20 to 30 wt.-%.

The quantity of polyisocyanate used in the process according to the present invention is preferably calculated so that the reaction mixture has an isocyanate index of from 70 to 130, preferably from 90 to 110. By "isocyanate index" is meant the quotient of the number of isocyanate groups and number of groups which are reactive with isocyanates, multiplied by 100.

Isocyanate-reactive components useful for the production of polyurethane in accordance with the present invention include: one or more higher molecular weight components and one or more lower molecular weight components. Examples of suitable isocyanate-reactive components that have higher molecular weights include compounds such as polyether polyols, polyester polyols, polycarbonate diols, polyhydric polythioethers, polyacetals, aliphatic thiols, solids containing polyols including graft polyols, polyisocyanate polyaddition polyols, polymer polyols, PHD polyols and mixtures thereof, etc. Lower molecular weight compounds include lower molecular weight polyether polyols and other diols and triols, which may also be referred to as chain extenders and/or crosslinkers.

Suitable reactants for use in the RIM process of the present invention include relatively high molecular weight compounds containing at least two isocyanate-reactive groups. These compounds generally have molecular weights of from 400 g/mol to 10,000 g/mol. The relatively low molecular weight chain extenders have molecular weights of from 62 to 399 g/mol. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water, alcohols, or amines. Examples of alcohols and amines include the low molecular weight chain extenders set forth hereinafter, 4,4'-dihydroxy-diphenylpropane, sucrose, aniline, ammonia, ethanolamine, and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351, 3,304,273, 3,523,093, and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carded out in situ in the polyether polyols.

Suitable examples of high molecular weight polyesters include the reaction products of polyhydric, preferably dihydric alcohols (optionally in the presence of trihydric alcohols), with polyvalent (preferably divalent) carboxylic acids. Instead of using the free carboxylic acids, it is also possible to use corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted (for example, by halogen atoms). The polycarboxylic acids and polyols used to prepare the polyesters are known and described, for example, in U.S. Pat. Nos. 4,098,731 and 3,726,952, herein incorporated by reference in their entirety. Suitable polythioethers, polyacetals, polycarbonates, and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders and Frisch, Interscience Publishers, New York, London, Vol. I, 1962, pages 32-42 and 44-54, and Volume II, 1964, pages 5-6 and 198-199; and in *Kunststoff-Handbuch*, Vol. VII, Vieweg-Hochtlen, Carl Hanser Verlag, Munich, 1966, pages 45-71.

Suitable aminopolyethers which may be used in accordance with the present invention as high molecular weight compounds (the molecular weight always being the average molecular weight which may be calculated from the functionality and the content of isocyanate-reactive groups) are those wherein at least 30 and preferably 60 to 100 equivalent percent of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by known methods. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, or chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and in French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428, and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines, or ketimines containing hydroxyl groups and subsequent hydrolysis.

It is preferred to use amino polyethers obtained by hydrolysis of compounds containing terminal isocyanate groups, for example, in accordance with German Offenlegungsschrift 2,948,419 or U.S. Pat. No. 4,515,923, herein incorporated by reference in its entirety. In this process, polyethers most preferably containing 2 to 4 hydroxyl groups are allowed to react with polyisocyanates to form NCO prepolymers and, in a second step, the isocyanate groups are converted by hydrolysis into amino groups.

The aminopolyethers used in accordance with the invention are often mixtures of the compounds mentioned by way of example and (on a statistical average) most preferably contain 2 to 4 terminal isocyanate-reactive groups. In the process useful in the invention, the aminopolyethers may be used in admixture with polyhydroxypolyethers free from amino groups.

In accordance with the present invention, the high molecular weight compounds are used in admixture with up to 95% by weight (preferably up to 50% by weight, more preferably 8 to 30% by weight, and most preferably 12 to 26% by weight), based on the total quantity of the high molecular weight compounds, of the low molecular weight chain extenders. Examples of suitable hydroxyl group-containing chain extenders include ethylene glycol, 1,2- and 1,3-propane-diol 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, and trimethylolpropane.

Other suitable chain extenders include aromatic polyamines (preferably diamines) having molecular weights of less than 400 g/mol, especially the sterically hindered aromatic polyamines (preferably diamines) having molecular weights of less than 400 g/mol, especially the sterically hindered aromatic diamines which contain at least one linear or branched alkyl substituent in the ortho-position to the first amino group and at least one (preferably two) linear or branched alkyl substituents containing from 1 to 4 (preferably 1 to 3) carbon atoms in the ortho-position to a second amino group. These aromatic diamines include 1-methyl-3.5-diethyl-2.4-diaminobenzene, 1-methyl-3.5-diethyl-2,6-diamino-benzene, 1,3,5-trimethyl-2,4-diaminobenzene, 1,3,5-triethyl-2,4-diamino-benzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-3-isopropylbenzene, and mixtures of the above diamines. Most preferred are mixtures of 1-methyl-3,5-diethyl-2,4-diaminobenzene and 1-methyl-3,5-diethyl-2,6-diaminobenzene in a weight ratio between 50:50 to 85:15 (preferably 65:35 to 80:20).

In addition, aromatic polyamines may be used in admixture with the sterically hindered chain extenders and include, for example, 2,4- and 2,6-diaminotoluene, 2,4'- and/or 4,4'-diaminodiphenylmethane, 1,2- and 1.4-phenylenediamine, naphthalene-1,5-diamine and triphenylmethane4,4',4"-triamine. The difunctional and polyfunctional aromatic amine compounds may also exclusively or partly contain secondary amino groups such as 4.4'-di(methylamino)diphenylmethane or 1-methyl-2-methylamino-4-aminobenzene. Liquid mixtures of polyphenyl poly-methylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should be used in combination with one or more of the previously mentioned sterically hindered diamines or hydroxyl group-containing chain extenders.

Other materials which can be included in the reaction mixture included any of the materials generally used in the RIM art. Reinforcing fillers, which allow reduced contraction of the molded product upon cooling, as well as adjustment of tensile modulus and flex modulus, can also be used and are well known in the art. Suitable inorganic fillers include glass in the form of fibers or flakes, mica, wollastonite, carbon black, talc, calcium carbonate, and carbon fibers. Organic fillers, although less preferred, are also suitable.

Other additives which may be used in the present invention include catalysts, especially tin(II) salts of carboxylic adds, dialkyltin salts of carboxylic acids, dialkyltin mercaptides, dialkyltin dithioesters, and tertiary amines. Preferred among these catalysts are dibutyltin dilaurate and 1,4-diazabicyclo[2,2,21]octane (triethylene diamine), especially mixtures of these catalysts. The catalysts are generally used in amounts of 0.01 to 10% (preferably 0.05 to 2%), based on the weight of the high molecular weight component.

It is also possible to use surface-active additives such as emulsifiers and foam stabilizers. Examples include siloxanes, N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxyethyl imidazole derivative of oleic acid, N-stearyl propylene diamine, and the sodium salts of castor oil sulfonates or of fatty acids. Alkali metal or ammonium salts of sulfonic acid, such as dodecylbenzenesulfonic add or dinaphthylmethanesulfonic acid, and fatty acids may also be used as surface-active additives. Particularly suitable surface-active compounds include polyether siloxanes of the type generally known for use in the polyurethane art, such as water-soluble polyether siloxanes. The structure of these siloxanes is generally such that a copolymer of ethylene oxide and propylene oxide is attached to a polydimethylsiloxane functionality. Methods of manufacturing preferred siloxanes are described in U.S. Pat. No. 4,906,721, the disclosure of which is herein incorporated by reference.

It is also possible to use mold release agents, which are compounds that are added to the reactive components of the isocyanate addition reaction, usually the isocyanate-reactive component, to assist in the removal of a polyurethane product from a mold. Suitable mold release agents for the present invention include those based at least in part on fatty acid esters (e.g., U.S. Pat. Nos. 3,726,952, 3,925,527, 4,058, 492, 4,098,731, 4,201,847, 4,254,228, 4,868,224, and 4,954, 537 and British Patent 1,365,215); metal and/or amine salts of carboxylic acids, amido carboxylic acids, phosphorus-containing acids, or boron-containing acids (e.g., U.S. Pat. Nos. 4,519,965, 4,581,386, 4,585,803, 4,876,019, 4,895, 879, and 5,135,962); polysiloxanes (e.g., U.S. Pat. No. 4,504,313); amidines (e.g., U.S. Pat. Nos. 4,764,540, 4,789, 688, and 4,847,307); resins prepared by the reaction of isocyanate prepolymers and a polyamine-polyimine component (e.g., U.S. Pat. No. 5,198,508); neutralized esters prepared from certain amine-started tetrahydroxy compounds described in U.S. Pat. No. 5,208,268; and aliphatic polyalkylene and polyalkadienes. Preferred mold release agents contain zinc stearate.

In addition to the reinforcement fillers, catalysts, surface-active agents, and mold release agents mentioned above, other additives which may be used in the molding compositions of the present invention include known fillers of other types, blowing agents, cell regulators, flame retarding agents, plasticizers, and dyes of the types generally known in the art.

The compositions according to the present invention are suited for processing by the RIM process. In general, in the RIM process, two separate streams are intimately mixed and subsequently injected into a suitable mold, although it is possible to use more than two streams. The first stream contains the polyisocyanate component, whereas the second stream contains the isocyanate-reactive component, chain extender, any internal mold release agent, and any other additives which are to be included.

In the known RIM process used for carrying out the process according to the present invention, the components may be mixed simultaneously, or the non-reactive components may be pre-mixed and then mixed with the reactive components. A starting temperature of from 10° to 70° C., preferably from 30° to 50° C. is preferably chosen for the mixture introduced into the mold. The temperature of the mold itself is preferably from 40° to 100° C., more preferably from 50° to 70° C. After completion of the reaction and molding process, the resultant product is removed from the mold. The resultant product preferably is an assembly comprising all parts of an LED lamp, i.e. in particular heat sink material forming a housing, LED bulb, LED printed circuit board, electronic driver board, screw-in base and the RIM material as joining and shielding element forming a base part.

The steps of making the inventive assembly, described for an LED lamp as an example, include:
1. Molding a housing made of thermally conductive thermoplastic polymer around the LED (encapsulating the LED), which is mounted to a circuit board.
2. Inserting the housing encapsulating the LED into a polyurethane reaction injection (RIM) mold, along with the power supply (driver board) and the threaded "Edison" connector which is preferably pre-wired (soldered).
3. Injecting a polyurethane mixture in a RIM process inside the "Edison" connector, around the driver board, and inside the housing.
4. Mechanically interlocking the polyurethane with the housing, either using holes in the heat sink or through a tongue-and-groove-mechanism.

As a result of this process, the "base" feature of the LED lamp is a RIM polyurethane material rather than a separate housing.

EXAMPLE

The present invention is further illustrated, but is not to be limited, by the following example, which is depicted in connection with the figures. Although the invention is exemplified in the context of an LED lamp, those skilled in the art will appreciate the applicability of the instant invention to a variety of assemblies containing a variety of electrical/electronic components, including, but not limited to, printed circuit boards, driver/controllers, light emitting diodes (LEDs), resistors, constant current drivers, capacitors, microprocessors, integrated circuits, photocells, piezo-transducers, inductors, and proximity switches. The LED lamp shown in the figures embodies the general idea of the invention. The materials of the housing and of the heat sink are only specified for the purpose of an example. Those skilled in the art will appreciate that such materials can be varied within the scope of the present invention.

Figure 1A:
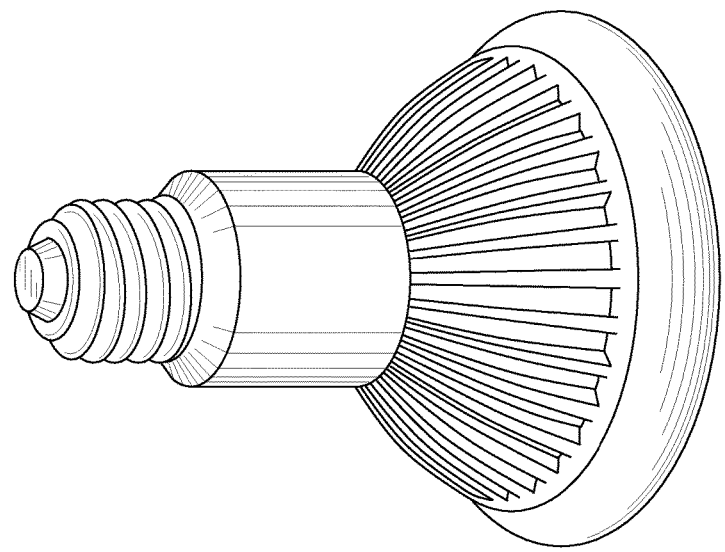

FIG. 1A is a photograph of a prior art LED lamp and FIG. 1B is an exploded version of the lamp of FIG. 1A. Such LED light bulbs and other electronics typically contain printed circuit boards ("PCBs") and other electronic components are electrically isolated from user contact. These devices must also have sufficient thermal management to keep operating temperatures below a critical value to extend service life. The electronics are typically inserted into the housing of the electronic device and encapsulated with a potting compound, such as epoxy, silicone, urethane or other materials depending on the application. The potting compound is an electrical insulator but also has sufficient thermal conductivity to keep the electronics at an acceptable operating temperature. Additional components such as screws, lenses, and trim rings, as shown in FIG. 1B, are necessary to complete the traditional assembly.

Figure 2:
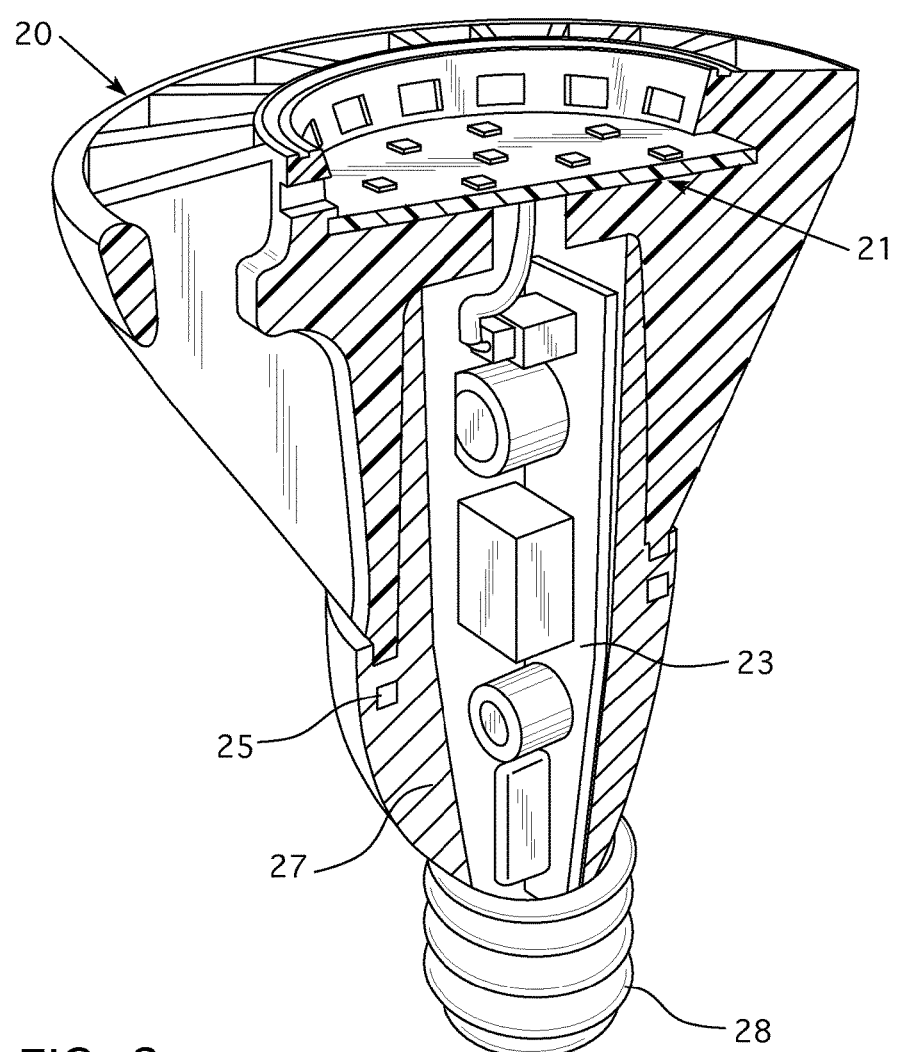
FIG. 2 is a cut away view of the inventive assembly of the present invention containing a heat sink made of a thermally conductive thermoplastic polymer and polyurethane reaction injection molded (RIM) material encapsulating the driver electronics and replacing the potting material.

FIG. 2 is a cut away view which illustrates the interior of the assembly of the present invention in which 21 is an LED printed circuit board ("PCB") insert molded into a thermally conductive thermoplastic polymer heat sink 20 and which is electrically connected to an electronic driver board 23. The thermally conductive thermoplastic polymer used may be MAKROLON TC8060 or TC8030 available from Bayer MaterialScience LLC. The driver board 23 is inserted into the heat sink 20, and connected, on the upper side to a LED printed circuit board 21 and on the lower side to a screw-in "Edison" type base 28. Holes 25, or a tongue and grove system may be provided in the heat sink 20 to permit a mechanical interlock with the RIM material. Reference numeral 27 is the RIM encapsulate and base material.

Figure 3:
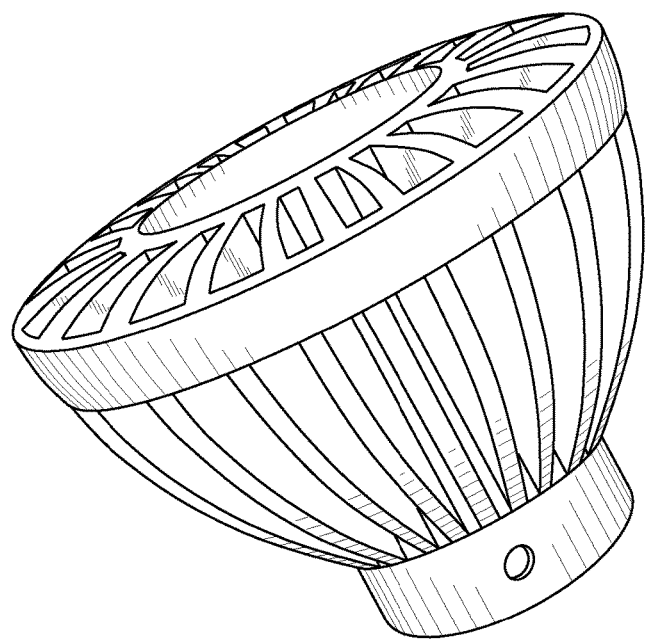
FIG. 3 shows an existing molded housing which has been modified to provide a mechanical interlock with the polyurethane RIM material.
Figure 4:
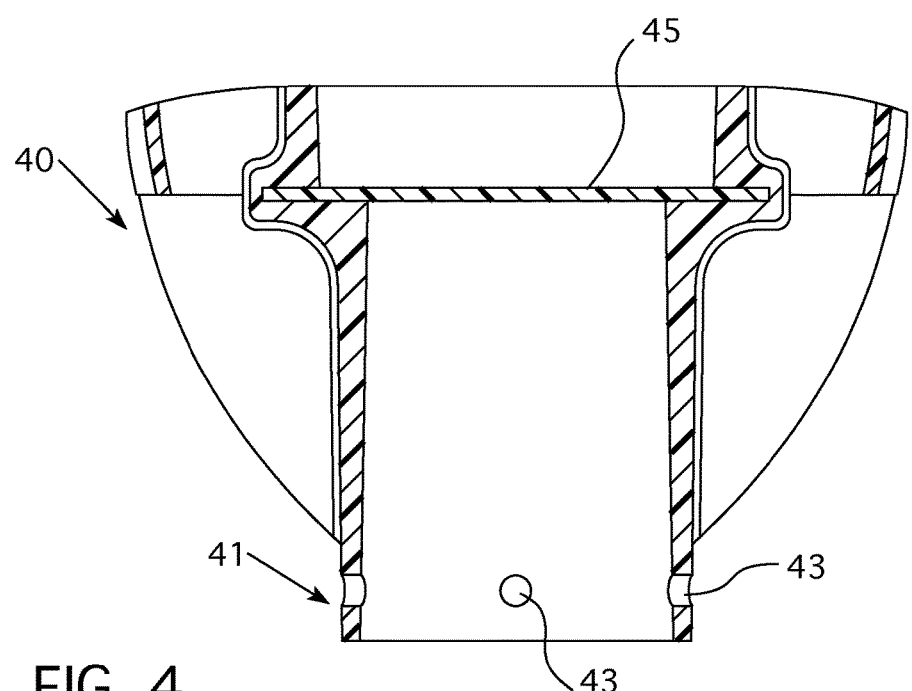
FIG. 4 shows a section view of the extension ring to provide mechanical interlock with the polyurethane RIM material.

FIG. 3 shows an existing molded housing which includes hole features according to the invention to provide a heat sink 40 having a mechanical interlock with polyurethane RIM material. The illustration in FIG. 4 is a cross section which shows the addition of an extension ring 41 with holes 43, to provide such a mechanical interlock with polyurethane RIM material. Circuit board with LED bulbs is shown at 45.

Figure 5:
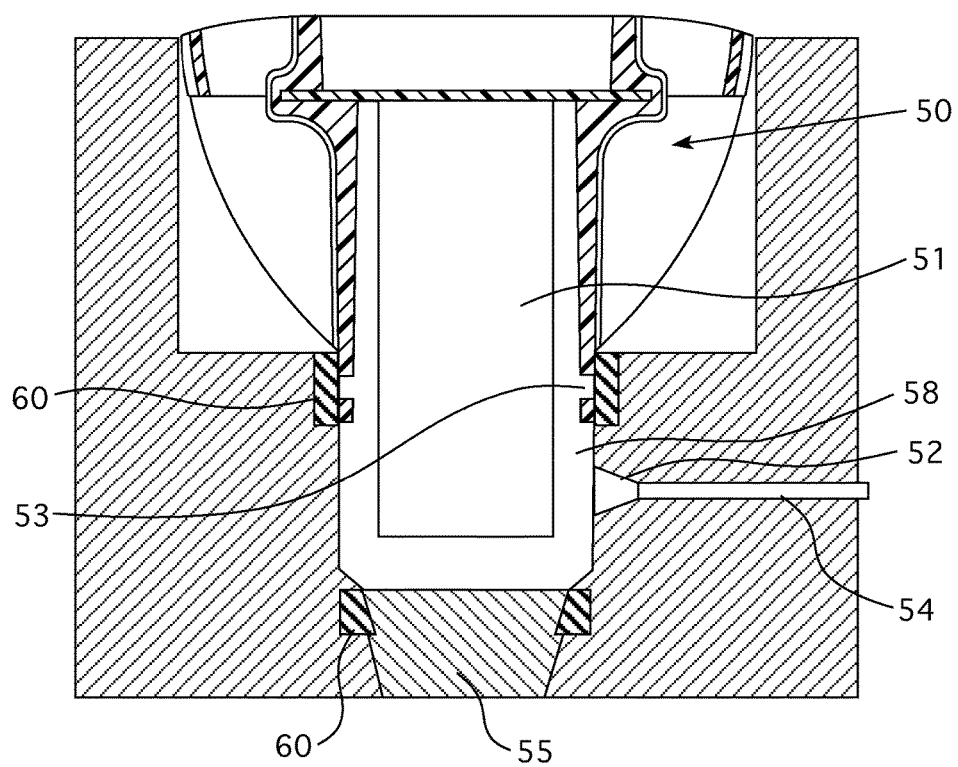
FIG. 5 is a diagram of a RIM tool including holes for mechanical locking of RIM material to plastic material.
Figure 6:
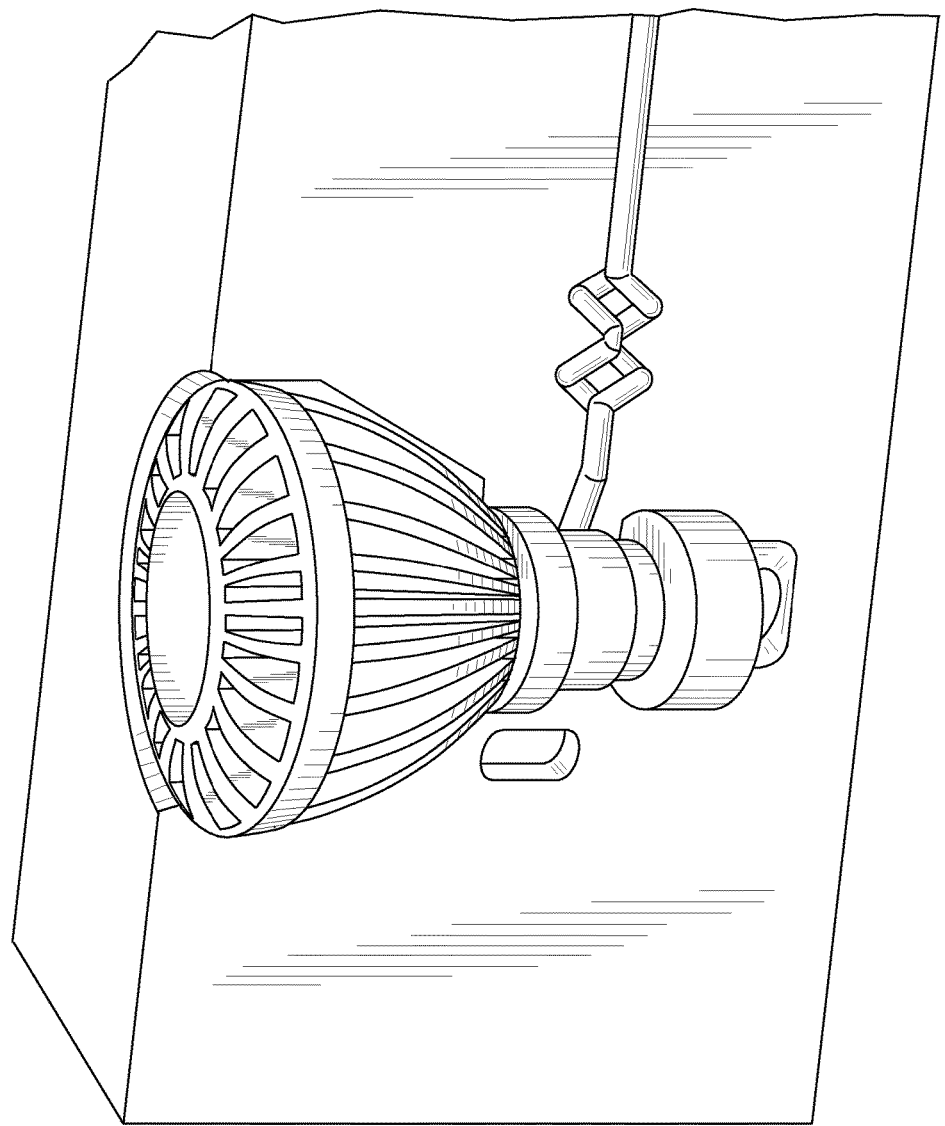
FIG. 6 is a photograph of the assembly of the present invention in the RIM mold.

FIG. 5 is a diagram of a RIM tool, a mold, including holes for mechanical locking of polyurethane RIM material to thermally conductive thermoplastic polymer material. Driver board 51 molded into heat sink 50 is encapsulated by polyurethane RIM material 58 which enters the mold through gate 52 and runner 54. An "Edison" type connector 55 is provided at the lower end of the tool. Gate 57 and runner 59 provides an entrance for the polyurethane mixture to be injected. Seals 60 cover the holes 53 to prevent the polyurethane RIM mixture from exiting the tool. FIG. 6 is a photograph of the assembly of the present invention in the RIM mold The foregoing example of the present invention is offered for the purpose of illustration and not limitation. It will be apparent to those skilled in the art that the embodiments described herein may be modified or revised in various ways without departing from the spirit and scope of the invention. The scope of the invention is to be measured by the appended claims.

As for other details of the present invention, materials and alternate related configurations may be employed as within the level of those with skill in the relevant art. The same may hold true with respect to process-based aspects of the invention in terms of additional acts as commonly or logically employed. In addition, though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. Such changes or others may be undertaken or guided by the principles of design for assembly.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in the appended claims, the singular forms "a," "an," "said," and "the" include plural referents unless the specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Stated otherwise, unless specifically defined herein, all technical and scientific terms used herein are to be given as broad a commonly understood meaning as possible while maintaining claim validity.

Various aspects of the subject matter described herein are set out in the following numbered clauses:

1. An assembly comprising: a heat sink comprising a thermally conductive thermoplastic polymer composition; an electrical/electronic component; and a polyurethane, wherein the heat sink partially or fully surrounds the electrical/electronic component, and wherein the polyurethane is reaction injection molded partially or fully surrounds the heat sink and one or more additional electronic components to form the assembly.

2. The assembly according to clause 1, wherein the thermally conductive thermoplastic polymer composition contains one selected from the group consisting of polypropylene, cycloolefin polymers, polycarbonate, polymethylmethacrylate and polystyrene.

3. The assembly according to clause 1, wherein the thermally conductive thermoplastic polymer composition comprises a blend selected from the group consisting of polycarbonate and polyethylene terephthalate, polycarbonate and polybutylene terephthalate, polycarbonate and polyphenylene sulfide, and polycarbonate and liquid crystalline polymers.

4. The assembly according to clause 1, wherein the thermally conductive thermoplastic polymer composition comprises polycarbonate.

5. The assembly according to any one of clauses 1 to 4, wherein the thermally conductive thermoplastic polymer composition comprises expanded graphite in an amount of from 10 wt.-% to 70 wt.-% of the composition.

6. The assembly according to any one of clauses 1 to 4, wherein the thermally conductive thermoplastic polymer composition comprises expanded graphite in an amount of from 20 wt.-% to 60 wt.-% of the composition.

7. The assembly according to any one of clauses 1 to 4, wherein the thermally conductive thermoplastic polymer composition comprises expanded graphite in an amount of from 30 wt.-% to 50 wt.-% of the composition.

8. The assembly according to any one of clauses 5 to 7, wherein at least 90% of the particles of the expanded graphite have a particle size of at least 200 microns.

9. The assembly, according to any one of clauses 1 to 8, wherein the electrical/electronic component is selected from the group consisting of a printed circuit board, a light emitting diode (LED), a resistor, a constant current driver, a driver/controller, a capacitor, a microprocessor, an integrated circuit, a photocell, a piezo-transducer, an inductor, and a proximity switch.

10. An assembly according to any one of clauses 1 to 9, wherein the electrical/electronic component comprises an LED printed circuit board and a driver/controller circuit board, wherein a heat sink encapsulates the LED printed circuit board, wherein the LED printed circuit board is mounted to the driver/controller circuit board, and wherein the polyurethane surrounds the driver printed circuit board and interlocks with the heat sink.

11. The assembly according to any one of clauses 1 to 10 further comprising at least one of a power supply and a threaded connector.

12. A process of making an assembly comprising: partially or fully surrounding an electrical/electronic component with a heat sink comprising a thermally conductive thermoplastic polymer; and forming the assembly by partially or fully surrounding the heat sink with a reaction injection molded polyurethane.

13. The process according to clause 12, wherein the thermally conductive thermoplastic polymer composition contains one selected from the group consisting of polypropylene, cycloolefin polymers, polycarbonate, polymethylmethacrylate and polystyrene.

14. The process according to clause 12, wherein the thermally conductive thermoplastic polymer composition comprises a blend selected from the group consisting of polycarbonate and polyethylene terephthalate, polycarbonate and polybutylene terephthalate, polycarbonate and polyphenylene sulfide, and polycarbonate and liquid crystalline polymers.

15. The process according to clause 12, wherein the thermally conductive thermoplastic polymer composition comprises polycarbonate.

16. The process according to any one of clauses 12 to 15, wherein the thermally conductive thermoplastic polymer composition comprises expanded graphite in an amount of from 10 wt.-% to 70 wt.-% of the composition.

17. The process according to any one of clauses 12 to 15, wherein the thermally conductive thermoplastic polymer composition comprises expanded graphite in an amount of from 20 wt.-% to 60 wt.-% of the composition.

18. The process according to any one of clauses 12 to 15, wherein the thermally conductive thermoplastic polymer composition comprises expanded graphite in an amount of from 30 wt.-% to 50 wt.-% of the composition.

19. The process according to any one of clauses 16 to 18, wherein at least 90% of the particles of the expanded graphite have a particle size of at least 200 microns.

20. The process according to any one of clauses 12 to 19, wherein the electrical/electronic component is selected from the group consisting of a printed circuit board, a light emitting diode (LED), a resistor, a constant current driver, a driver/controller, a capacitor, a microprocessor, an integrated circuit, a photocell, a piezo-transducer, an inductor, and a proximity switch.

21. A process of making an assembly according to any one of clauses 12 to 20, wherein the electrical/electronic component is an LED printed circuit board and the heat sink is a housing comprising a thermally conductive polycarbonate, wherein the LED printed circuit board is mounted to a driver/controller circuit board; and further including the steps of: inserting the heat sink together with the LED printed circuit board and the driver/controller circuit board into a polyurethane reaction injection (RIM) mold; injecting a polyurethane mixture into the connector and the housing; and removing the assembly from the mold.

22. The process according to clause 21, further including inserting a power supply in the mold before reaction injection molding the polyurethane.

What is claimed is:
1. An assembly comprising:
   a heat sink comprising a thermally conductive thermoplastic polymer composition;
   a first electrical/electronic component;

a second electrical/electronic component; and
a polyurethane,
  wherein the heat sink partially or fully surrounds the first electrical/electronic component, and
  wherein the polyurethane partially or fully surrounds the second electrical/electronic components to form the assembly,
  wherein the thermally conductive thermoplastic polymer composition comprises a blend selected from the group consisting of polycarbonate and polyethylene terephthalate, polycarbonate and polybutylene terephthalate, polycarbonate and polyphenylene sulfide, and polycarbonate and liquid crystalline polymers.

2. The assembly according to claim 1, wherein the first and second electrical/electronic components are each selected from the group consisting of a printed circuit board, a light emitting diode (LED), a resistor, a constant current driver, a driver/controller, a capacitor, a microprocessor, an integrated circuit, a photocell, a piezo-transducer, an inductor, and a proximity switch.

3. An assembly according to claim 1, wherein the first electrical/electronic component comprises an LED printed circuit board and the second electrical/electronic component comprises a driver/controller circuit board.

4. The assembly according to claim 1 further comprising at least one of a power supply and a threaded connector.

5. An assembly comprising:
  a heat sink comprising a thermally conductive thermoplastic polymer composition;
  a first electrical/electronic component;
  a second electrical/electronic component; and
  a polyurethane,
  wherein the heat sink partially or fully surrounds the first electrical/electronic component, and
  wherein the polyurethane partially or fully surrounds the second electrical/electronic components to form the assembly,
  wherein the thermally conductive thermoplastic polymer composition comprises expanded graphite in an amount of from 10 wt.-% to 70 wt.-% of the composition.

6. The assembly according to claim 5, wherein the thermally conductive thermoplastic polymer composition contains an amorphous thermoplastic polymer selected from the group consisting of polypropylene, cyclic olefin copolymers, polycarbonate, polymethylmethacrylate and polystyrene.

7. The assembly according to claim 6, wherein the thermally conductive thermoplastic polymer composition comprises polycarbonate.

8. The assembly according to claim 5, wherein the thermally conductive thermoplastic polymer composition comprises expanded graphite in an amount of from 20 wt.-% to 60 wt.-% of the composition.

9. The assembly according to claim 8, wherein the thermally conductive thermoplastic polymer composition comprises expanded graphite in an amount of from 30 wt.-% to 50 wt.-% of the composition.

10. The assembly according to claim 5, wherein at least 90% of the particles of the expanded graphite have a particle size of at least 200 microns.

11. The assembly according to claim 5, wherein the first and second electrical/electronic components are each selected from the group consisting of a printed circuit board, a light emitting diode (LED), a resistor, a constant current driver, a driver/controller, a capacitor, a microprocessor, an integrated circuit, a photocell, a piezo-transducer, an inductor, and a proximity switch.

12. An assembly according to claim 5, wherein the first electrical/electronic component comprises an LED printed circuit board and the second electrical/electronic component comprises a driver/controller circuit board.

13. The assembly according to claim 5 further comprising at least one of a power supply and a threaded connector.

14. A process of making an assembly comprising:
  partially or fully surrounding a first electrical/electronic component with a heat sink comprising a thermally conductive thermoplastic polymer;
  partially or fully surrounding a second electrical/electronic component with a reaction injection molded polyurethane; and
  forming the assembly by interlocking the reaction injection molded polyurethane with the heat sink,
  wherein the thermally conductive thermoplastic polymer composition comprises a blend selected from the group consisting of polycarbonate and polyethylene terephthalate, polycarbonate and polybutylene terephthalate, polycarbonate and polyphenylene sulfide, and polycarbonate and liquid crystalline polymers.

15. The process according to claim 14, wherein the first and second electrical/electronic components are each selected from the group consisting of a printed circuit board, a light emitting diode (LED), a resistor, a constant current driver, a driver/controller, a capacitor, a microprocessor, an integrated circuit, a photocell, a piezo-transducer, an inductor, and a proximity switch.

16. The process according to claim 14, further comprising a step of inserting a power supply into a polyurethane reaction injection mold before reaction injection molding the polyurethane.

17. A process of making an assembly comprising:
  partially or fully surrounding a first electrical/electronic component with a heat sink comprising a thermally conductive thermoplastic polymer;
  partially or fully surrounding a second electrical/electronic component with a reaction injection molded polyurethane; and
  forming the assembly by interlocking the reaction injection molded polyurethane with the heat sink,
  wherein the thermally conductive thermoplastic polymer composition comprises expanded graphite in an amount of from 10 wt.-% to 70 wt.-% of the composition.

18. The process according to claim 17, wherein the thermally conductive thermoplastic polymer composition contains an amorphous thermoplastic polymer selected from the group consisting of polypropylene, cyclic olefin copolymers, polycarbonate, polymethylmethacrylate and polystyrene.

19. The process according to claim 18, wherein the thermally conductive thermoplastic polymer composition comprises polycarbonate.

20. The process according to claim 17, wherein the thermally conductive thermoplastic polymer composition comprises expanded graphite in an amount of from 20 wt.-% to 60 wt.-% of the composition.

21. The process according to claim 20, wherein the thermally conductive thermoplastic polymer composition comprises expanded graphite in an amount of from 30 wt.-% to 50 wt.-% of the composition.

22. The process according to claim 17, wherein at least 90% of the particles of the expanded graphite have a particle size of at least 200 microns.

23. The process according to claim 17, wherein the first and second electrical/electronic components are each selected from the group consisting of a printed circuit board, a light emitting diode (LED), a resistor, a constant current driver, a driver/controller, a capacitor, a microprocessor, an integrated circuit, a photocell, a piezo-transducer, an inductor, and a proximity switch.

24. The process according to claim 17, further comprising a step of inserting a power supply into a polyurethane reaction injection mold before reaction injection molding the polyurethane.

25. A process of making an assembly comprising:
partially or fully surrounding an LED printed circuit board with a heat sink comprising a thermally conductive thermoplastic polymer;
partially or fully surrounding a driver/controller circuit board with a reaction injection molded polyurethane; and
forming the assembly by interlocking the reaction injection molded polyurethane with the heat sink.

26. The process according to claim 25, wherein the thermally conductive thermoplastic polymer composition contains an amorphous thermoplastic polymer selected from the group consisting of polypropylene, cyclic olefin copolymers, polycarbonate, polymethylmethacrylate and polystyrene.

27. The process according to claim 26, wherein the thermally conductive thermoplastic polymer composition comprises polycarbonate.

* * * * *